April 3, 1962 H. KAPPELER ET AL 3,028,453

TELEPHONE SUBSTATION INCLUDING PRE-SETTING MEANS FOR MULTIPLE SYMBOL COMBINATIONS

Filed Oct. 7, 1957 4 Sheets-Sheet 1

INVENTORS:
HANS KAPPELER
RUDOLF STREIT
By Kurt Kelman, att'y

INVENTORS:
HANS KAPPELER
RUDOLF STREIT
By Kulluhuin, Att'y

INVENTORS:
HANS KAPPELER
RUDOLF STREIT
By Karl ... Att'y

April 3, 1962 H. KAPPELER ET AL 3,028,453

TELEPHONE SUBSTATION INCLUDING PRE-SETTING MEANS FOR MULTIPLE SYMBOL COMBINATIONS

Filed Oct. 7, 1957 4 Sheets-Sheet 4

INVENTORS
HANS KAPPELER
AND RUDOLF STREIT

BY Thomas U Michaelis
ATTORNEY

United States Patent Office 3,028,453

Patented Apr. 3, 1962

3,028,453

TELEPHONE SUBSTATION INCLUDING PRE-SETTING MEANS FOR MULTIPLE SYMBOL COMBINATIONS

Hans Kappeler and Rudolf Streit, Solothurn, Switzerland, assignors to Autophon Aktiengesellschaft, Solothurn, Switzerland Filed Oct. 7, 1957, Ser. No. 688,583
Claims priority, application Switzerland Oct. 18, 1956
3 Claims. (Cl. 179—81)

This invention relates to telephony, and more particularly to telephone sub-stations incorporating means for pre-setting multiple signal combinations.

According to the present state of the art, automatic telephone systems use for the transmission of the subscribers' numbers between sub-stations and the exchange, almost exclusively direct current impulses generated by means of a dial. The spreading of long distance dialing systems caused the number sequences to be dialed, to become very complex, a fact which makes quite some demands on the person dialing a number. In consequence, numerous attempts have been made at designing systems which permit the number to be dialed, before the subscriber's line is engaged, to be quietly pre-set and checked, whereafter the subscriber's line is engaged and the pre-set number is transmitted quickly and faultlessly, by means of a mechanical impulse generator, to the exchange. These proposed systems, however, all fell short of adoption as they were complex and complicated and therefore, excessively expensive.

In recent years, the construction of telephone exchanges has been marked by a tendency to materially shorten the time for making a connection, by a far-reaching recourse to electronic switching systems. These electronic switching systems are used only for making the connection, and thus are to be at the disposal of the subscriber only for the time it takes to make the connection. Inasmuch as these electronic systems are complex and expensive, it is necessary, in order to keep the number of such systems to a minimum, to limit as much as possible the time the systems are occupied. As this time of occupation depends mainly on the period which the subscriber spends in the transmission of the selected number, the aim is to replace the relatively slow selection of impulses by a dial, by a more rapid procedure. The advent of the transistor technology, with the consequent possibility of accommodating amplifier elements in the sub-station and to supply the same via the subscriber's line, has rendered such a speed-up feasible.

It is an object of the present invention to provide, in response to the recent demands of the art noted above, a telephone system combining facilities for pre-setting the desired number, with a materially accelerated transmission of the selection criteria from the subscriber's station to the exchange, in a simple, yet thoroughly effective manner.

Other objects, and the manner in which the same are attained, will become apparent as this specification proceeds.

The invention contemplates a telephone subscriber's sub-station incorporating means for pre-setting multiple signal combinations with the aid of setting elements coordinated with each place or digit. The station is further equipped with transmitting means which permit the emission, in the form of impulses, of a set signal combination. The station is distinguished in that the transmitting means comprise a magnetic scanning device which is movable along a predetermined path, and that the impulses are recorded on information carriers adapted to be scanned by the afore-noted scanning device. A further feature of the invention consists in that the setting means are arranged to place the information carriers in such positions that the impulse recordings corresponding to the setting of the setting means, are disposed in the path of the scanning device.

The impulses to be used in accordance with the invention, may be audio frequency impulses or simple impulses transmissible at a rate of from 500 to 5000 impulses per second.

In the drawings accompanying this specification and forming part thereof, two embodiments of the invention, and various details of construction of some modifications, are illustrated diagrammatically by way of example.

Figures 3, 4, 5, 6, 7, 8:
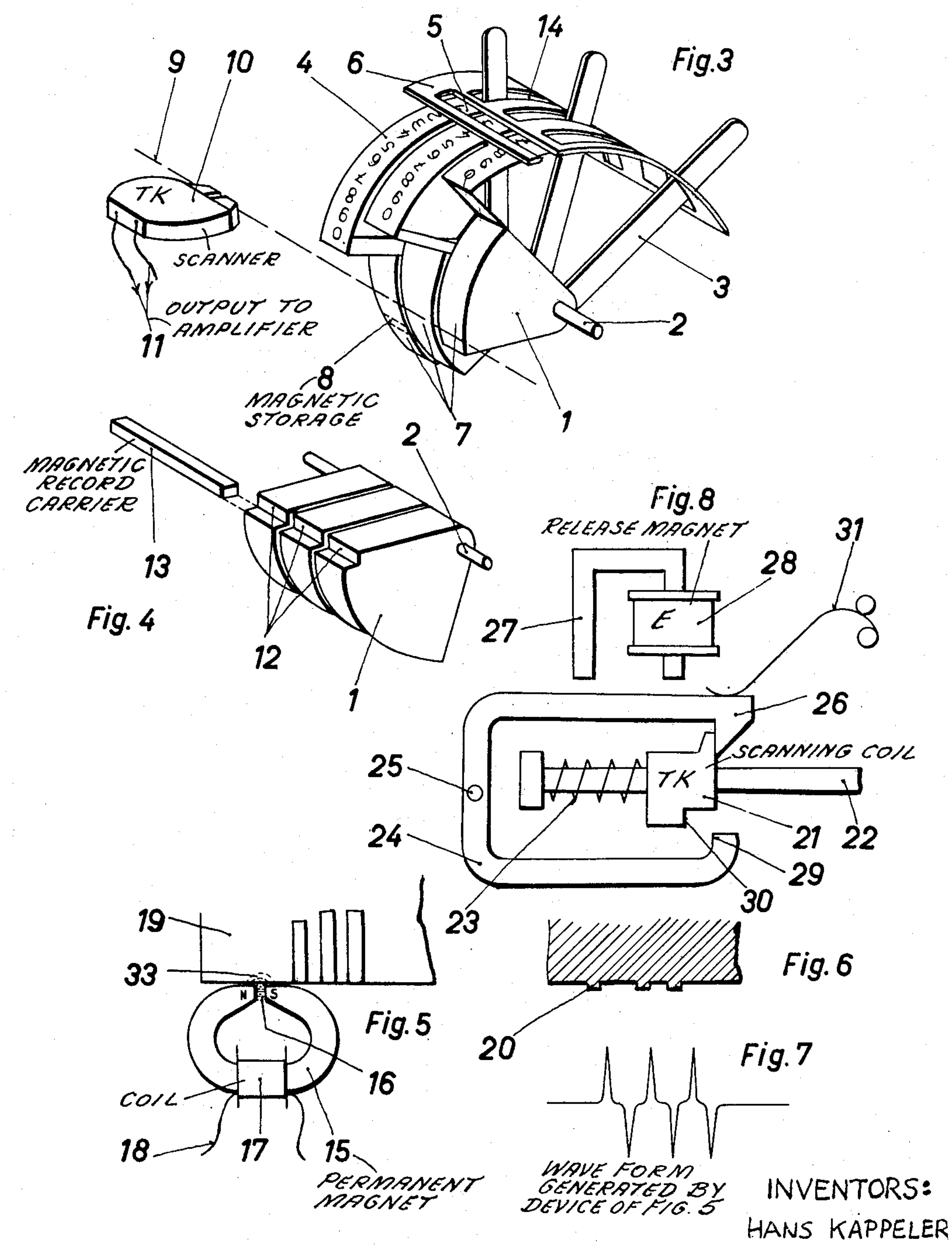
FIG. 3 illustrates diagrammatically, in a perspective side view, an embodiment of a setting means in set position, and the scanning device with the scanning path.
FIG. 4 shows a modification of the setting means illustrated in FIG. 3, in their position of rest.
FIGS. 5 and 6 show, on an enlarged scale, two fragmentary embodiments of information carriers with simple impulses recorded thereon, and a diagrammatic representation of a scanning device correlated therewith.
FIG. 7 shows a diagram of the impulses which are emitted by the scanning device shown in FIG. 5, in conjunction with the information carriers shown in FIGS. 5 and 6.
FIG. 8 shows diagrammatically an embodiment of the device for starting the scanning device, as required for a station according to the circuit diagram of FIG. 2.

Referring to the drawings wherein like elements are denoted by identical reference numerals, and first to FIG. 3, this embodiment of the invention including setting means, information carriers and a correlated scanning device comprises sectors 1 which are supported for rotation on a shaft 2. Levers 3 permit to place these sectors in any one of eleven positions. The casing 6 is provided with slots 14, the levers 3 being arranged for displacement in these slots. A window 5 renders visible the figure indicators 4 which form part of each sector and setting lever aggregate, so that the prevailing position of the setting means can readily be ascertained by a glance in the window. On their faces 7 which relative to the axis of rotation 2 extend in a circular cylindrical plane, the sectors 1 carry a layer such as a foil of highly coercive material wherein ten selection criteria corresponding to the ten digits per decimal place and consisting of one or several impulses, are recorded magnetically, the direction of recording extending in parallel to the shaft 2. The location of a single one of these records is indicated at 8. The records are so arranged with respect to the other components of each sector aggregate that the records which correspond to the set figures appearing in the window 5, are dispose in a straight line 9 extending in parallel to the shaft 2. A scanning device 10 can be displaced, by means not shown in the drawing, along the scanning path represented by the straight line 9, so that it moves progressively past the recording faces 7 of all the sectors 1, scans the impulses magnetically recorded thereon, and delivers a corresponding output voltage which through conductors 11, is passed to an amplifier. Inasmuch as due to the presetting of the sectors, the records disposed in the scanning path 9 incorporate the impulses which correspond to the set figure, the movement of the scanning device 10 past these records effects the transmission of the impulses corresponding to the set figure. The drive of the scanning device is preferably effected by means of a spring mechanism 23 capable of being wound up, which drives the scanning device by means of a screw, chord, chain or else by a striking action known in connection with shuttles.

FIG. 4 illustrates a modification of the device according to FIG. 3 which permits the same scanning device 10 to scan also record carriers which are introduced into the station from the outside. These carriers, preferably, are provided with the records of completely composed impulse combinations which correspond to numbers to be dialed frequently. As shown in FIG. 4, the sectors 1 are provided, at points which in the initial position of the sectors are disposed in the scanning path 9, with recesses 12. Provided all setting means are in their initial positions, as shown in FIG. 4, one of such record carriers 13 which, as illustrated, may be provided in the form of a square rod, may be slid from the outside into the scanning path 9, to have its surface scanned by the scanning device (not shown in FIG. 4). Records may be provided on all the faces of a polygonal bar so that a few such bars or rods permit keeping a reserve of quite a large number of records. The impulse sequence to be transmitted, of course, is determined by that face of the bar or rod which in the position selected when the bar is introduced into the station, faces the scanning path.

The disk sectors provided with levers constituting the setting means of FIGS. 3 and 4 may be replaced by various other devices. Thus it is possible to provide the setting means in the form of round disks one half of which serves as record carrier, whereas the other half is arranged to permit direct setting by using a finger; or disks may be provided the entire circumference of which serves as record carrier so the disks may be of much smaller size, setting being effected, preferably, by means of a transmission gear. Instead of being provided rotary, the setting means, of course, may be provided in the form of slides. As with other setting means, any setting means contemplated by the invention require a grating so the setting can be effected with the necessary precision. A return or resetting mechanism should also be provided for whatever particular setting means is employed, which should effect the return in a single movement. This device may be actuated by the replacement of the microtelephone receiver; preferably, however, it is arranged independently from the other components of the station to permit, if necessary, a repetition of the dialing on the basis of the prevailing setting. This return mechanism does not form part of the invention and may be of any known type; accordingly, a detailed description thereof may be dispensed with.

In contradistinction to the embodiments of setting means referred to above which involve direct manual setting for each decimal place, it is also possible to provide sole means common to all decimal places whereby the setting means correlated with the various decimal places can be set one after the other. These means which do not form part of the invention and therefore, are not described in detail, tend to simplify the operation of the station as well as to effect a saving of space. They may incorporate keys or pull dials, for example.

The devices described so far include an information carrier of highly coercive material on which the impulses are recorded magnetically, whereas the scanning is effected by means of a scanning device of the type known from the sound heads of magnetic tape recorders. These scanning devices involve the material drawback that in the course of the scanning procedure, they must either touch the information carrier or at least move past it in very close proximity, conditions which involve mechanical difficulties. As long as audio frequency impulses are relied upon, however, these scanning devices must be used and cannot be replaced. The use of audio frequency impulses has other drawbacks in addition to the disadvantage just referred to. In the first place, the speed of transmission which can be attained is limited by the fact that each audio impulse must involve a certain minimum number of oscillations, while in the second place, the rate of travel of the sound head is required to conform to close tolerance limits as the frequency of the impulses is proportional to the rate of travel.

The last-named drawbacks can be avoided by the use of simple impulses in the place of audio frequency impulses. Such impulses, of rectangular or bell-shaped configurations, can be scanned at a rate of from 500 to 5000 impulses per second so a rate of transmission is obtained which is greatly increased by comparison with that obtainable when audio frequency impulses are used. The criterion for a figure transmitted may be either the number of impulses, or a code: A code offers the advantage of reduced susceptibility to disturbances. A uniform or a different polarization, or an omission of certain impulses within a group, may be resorted to for this purpose. Such impulses can be recorded magnetically and reproduced on the same principle as audio frequency impulses. It is, however, possible to effect recording and scanning on a different principle.

This principle is illustrated in FIGS. 5 to 7. A scanning device is employed which includes a permanent magnet 15 having an air gap 16. In front of this air gap, a magnetic field 33 is generated. The magnetic flux in this scanning device depends on the magnetic reluctance of the material in which the exterior magnetic field extends. If this reluctance varies, the varying magnitude of the flux is bound to induce voltages in the coil 17 of the scanning device which through wires 18, are passed to the amplifier. FIGS. 5 and 6 show two embodiments of information carriers which oppose a varying magnetic reluctance to the magnetic field 33 of the scanning device. The information carrier 19 consists of alternating laminations of brass and iron laminae, the iron laminae being shown in solid black. It derives from the above explanations that in the course of travel of the scanning device past this information carrier, there is generated, at the output 18 of the coil 17, the voltage characteristic shown in FIG. 7. The positive or negative component, or both, of this characteristic can be utilized. In the place of a laminated information carrier, a carrier of uniform ferromagnetic material may be used, in which case the flux is influenced, as shown in FIG. 6, by projections 20 or recesses provided on or in the surface. The distribution of the projections which, for example, may be made by stamping, corresponds to a code. Tht use of an information carrier involving a varying magnetic resistance, in conjunction with a scanning device including a permanent magnet, offers, relative to a magnetized information carrier, the very important advantage that in the course of scanning, the scanning device is not required to touch the information carrier. It is sufficient if it passes at a distance from the information carrier which is small by comparison with the width of the records.

In connection with the embodiments of the invention described above, it was always assumed that each setting means permits setting any one of ten different figures. The number of figures or symbols for which the setting means can be set, of course is not limited to ten. Provided the information carriers are sufficiently wide, it is also possible to co-ordinate with the various positions of the setting means, combinations of impulses or impulse groups so that, for example, exchanges with coil numbers with two digits, or multiple long distance code numbers, can be set by means of a single setting means, which passes into the scanning path, the record of the complete combination of the corresponding impulses. The use of audio impulses offers various possibilities. Apart from using impulses consisting of a single sound, it is, of course, possible to produce the various selection criteria by two sounds emitted simultaneously or consecutively, the two sounds having been recorded on the information carrier either simultaneously or consecutively.

The introduction of the transistors has given rise to a trend tending to replace the carbon microphone by a less sensitive, yet qualitatively improved microphone. The most suitable substitute is a magnetic microphone the output signal of which is amplified to the line level by means of a transistor amplifier. If such an amplifier is present, it can also be called upon to amplify the signals deriving from the scanning device. Other possibilities exist, of course, where only a part, e.g. the terminal stage of the microphone amplifier, is used jointly, whereas the microphone and the scanning device both, or the microphone along, are provided with separate input stages.

The emission of the pre-set signal must not be effected before the exchange is ready to receive it. If the start of this emission were left to the subscriber, essential advantages of the rapid transmission of the selection would be eliminated. Consequently it is recommended to provide the stations according to the invention with devices which cause the scanning device to be put in operation by a criterion emitted by the exchange.

Figure 1:
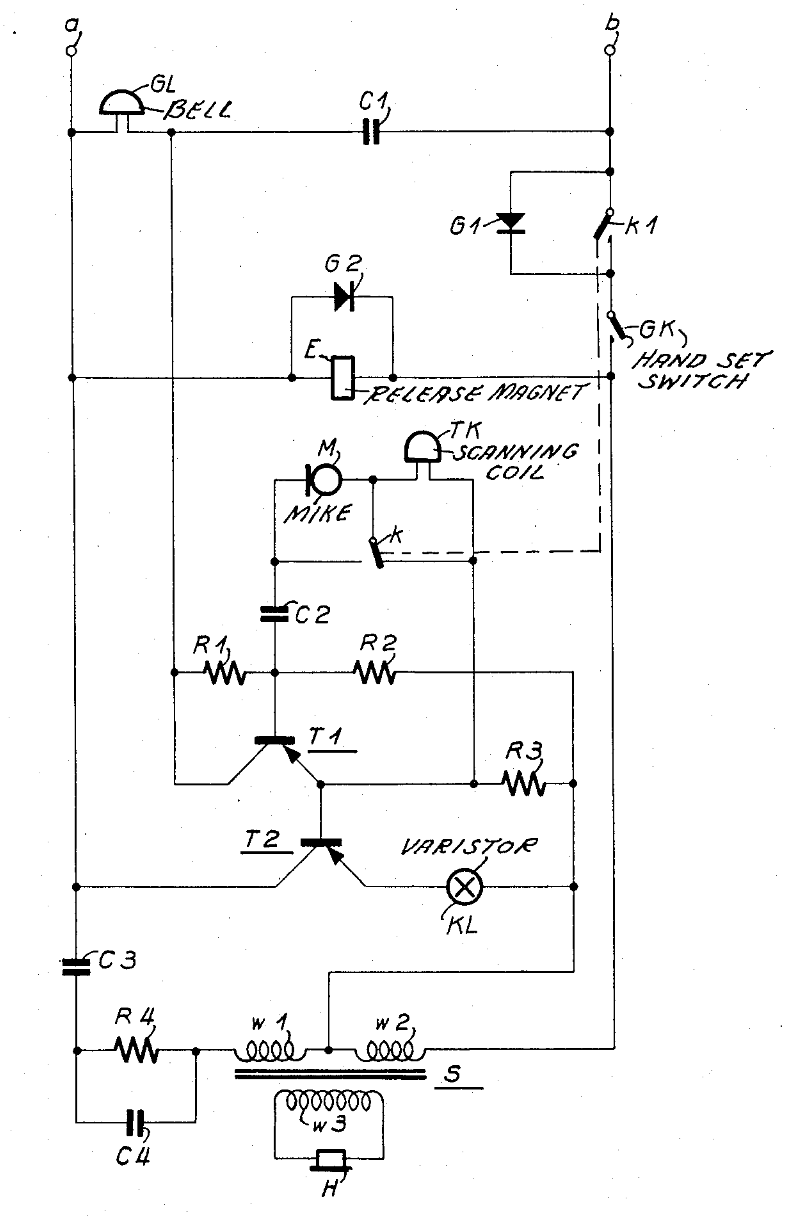
FIGS. 1 and 2 show circuit diagrams of two embodiments of the invention.
Figure 2:
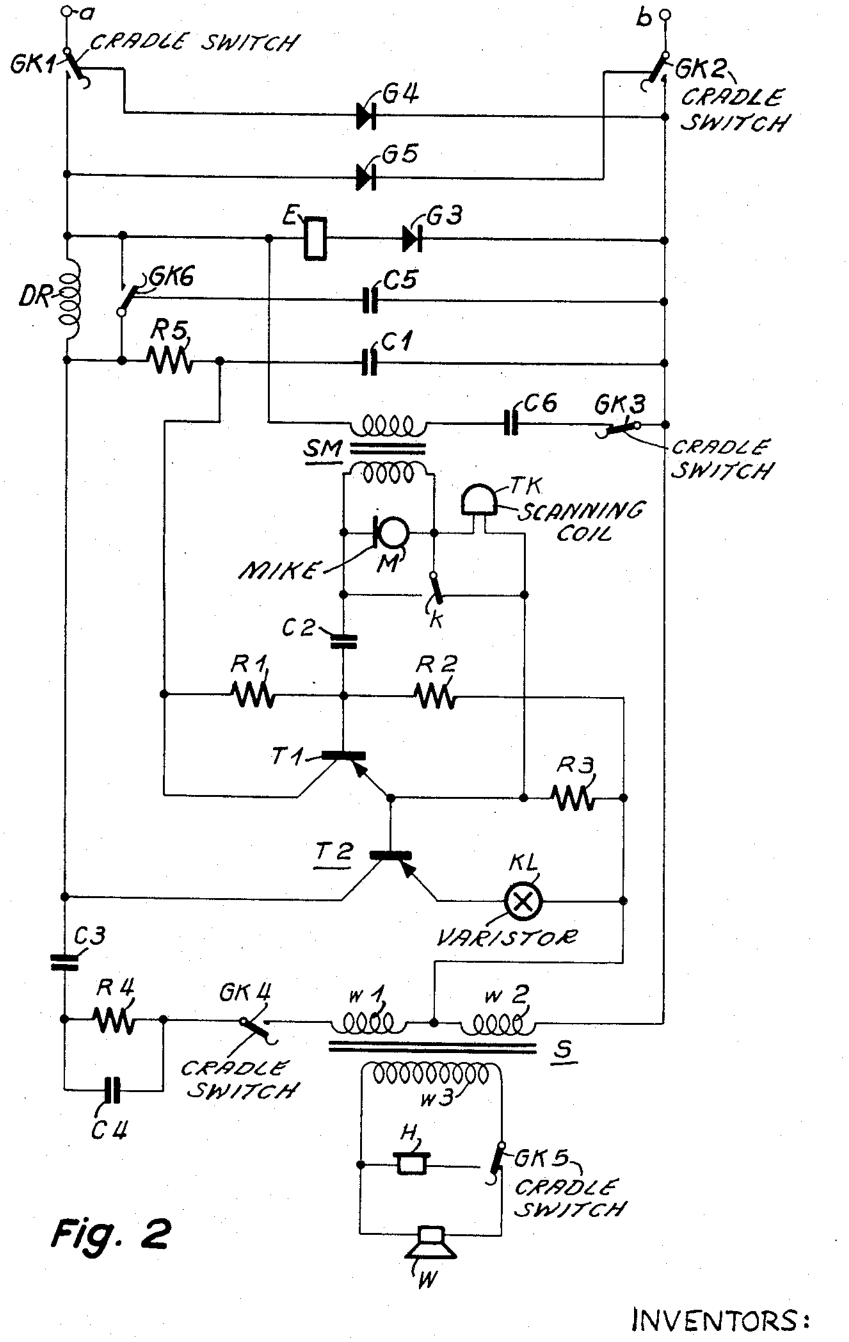

FIGS. 1 and 2 show circuit diagrams of two embodiments of a station according to the invention, the embodiments having in common that the same amplifier is used as the microphone amplifier as well as the amplifier for the signals deriving from the scanning device. Both embodiments are also provided with a system which renders the commencement of the emission of selection criteria dependent on the emission of a criterion by the exchange. The embodiments differ with respect to details of this system, and also relative to the ringing system. While in the station according to FIG. 1, the ringing is effected, in a conventional manner, by a bell actuated by low frequency alternating current, the station of FIG. 2 incorporates an electro-acoustic transducer for reproducing an audio frequency call signal.

The station according to FIG. 1 includes a differential transformer S connected in a well known manner. The winding W1 of this transformer leads to the balancing network consisting of the resistor R4 and the condenser C4, and the condenser C3 impedes the flow of direct current through the winding W1. The receiver H is connected to the winding W3. The sidetone damping effect produced by the differential transformer S is assumed to be sufficiently well known as to require no detailed description. The station is called by means of a bell GL which is connected with the line, in series with the condenser C1, in a well known manner. The amplifier built into the station contains the transistors T1 and T2. The following description is based on transistors of the p-n-p type, but the n-p-n type could be used just as well, the change implying, of course, a change of all polarities. The amplifier operates as follows: The magnetic microphone M is connected via the contact $k$ to the emitter, and through the condenser C2 to the base of the transistor T1. This transistor is operated in a collector circuit and receives its supply via the bell GL and through the winding W2 of the transformer S. Its base receives a negative bias relative to the emitter, from the voltage divider consisting of the resistors R1 and R2. The bell GL and the condenser C1, together act as a low pass filter so that the supply of the aforementioned elements is free from the alternating voltages existing on the line. This filtering is necessary as the amplifier output is connected to the same line which feeds the supply. It impedes the occurrence of a positive or negative feedback of such magnitude as to render the amplifier inoperative. The emitter resistor R3 serves as operating resistor of the transistor T1 and effects at the same time, a direct current-wise negative feedback designed to reduce the dependence of the collector current on the transistor characteristic and the temperature. The voltage generated on the resistor R3 is fed to the base of the transistor T2, its direct current component serving as bias for the base relative to the emitter. The varistor KL in the emitter circuit, the resistance of which increases when the current rises, effects a negative feedback which increases when the current rises. This arrangement results in a variable gain depending on the feed voltage of the station, in that with a high voltage, the current and thus also the negative feedback increase, so the amplification is reduced, and vice versa. Consequently, the gain is reduced for short subscriber's lines while it is increased for long lines. The output signal of the transistor T2 is applied between the line $a$ and the middle of the transformer S, i.e. between those points between which, in a conventional station, the carbon microphone is connected. TK denotes the coil of the (previously described) scanning device. In the position of rest of the station, this coil is short-circuited by the contact $k$. The contact $k$ is actuated as soon as the scanning device is readied for a scanning operation, by the person using the station. This readying procedure consists, for example, in the placement of the scanning device in its initial position, and the tensioning of the drive spring driving the device along the scanning path. It is also feasible to provide means which render the state of preparedness of the scanning device dependent on some prior adjustment of the setting means. When the contact $k$ is tilted the scanning device is connected with the input of the amplifier whereas the microphone M is short-circuited. This contact enables the same amplifier to be used alternately as the microphone amplifier, and as amplifier for the selector impulses to be emitted. The contact $k1$ the function of which will be explained below, is reversed together with the contact $k$. When the scanning operation is terminated both these contacts are returned automatically into their initial positions.

When the station is at rest, the exchange applies a polarity which is inversed relative to the amplifier, i.e. plus is placed on the $a$-line and minus on the $b$-line. Since contact $k1$ is open it is not possible to engage the exchange as long as the station is not ready to emit the selection criteria, as in this case the loop of the subscriber's line cannot be closed. If, however, prior to the lifting of the hand set, the emission of the selection criteria was well prepared and thus, contact $k1$ was closed, on the cradle switch contact GK being closed the current passes from the terminal $a$ through the rectifier G2, the cradle switch contact and the contact $k1$ to the terminal $b$ whereby the exchange is engaged. The scanning device is not operated at once. As soon as the exchange is ready to receive the selection impulses, it reverses the polarity of the subscriber's line so minus is placed on the terminal $a$, and plus on the terminal $b$. The rectifier G2 is now positioned, relative to this polarity, in backward direction so that the coil E is traversed by the current. The amplifier receives the proper polarity and in consequence, starts operating. E designates the coil of a release magnet (not shown in detail) which as soon as it is traversed by the current, initiates the operation of the scanning device. Consequently, the emission of the selector impulses is effected precisely at a time when the exchange is ready to receive them. In order to enable the loop to be closed by the cradle switch contact when the station is called from the exchange, it is necessary that the exchange reverse the polarity relative to that of the rest position, already at the very start of the call. When the cradle switch contact closes, the open contact $k1$ is bridged by the rectifier G1. The coil E also in this case, is traversed by current, which fact, however has no significance. If by chance, a call should be answered while the scanning device is in its state of preparedness, it is set operating without this fact having any consequence as far as the exchange s concerned; it effects, however, the return of the contact $k$ into the rest position. This is quite necessary in this particular case, as the microphone must be released so a conversation can take place.

The station according to FIG. 2 differs from that of FIG. 1 with respect to the equipment for initiating the scanning operation, as well as the calling system. The arrangement of the amplifier, the transformer S and the balancing network correspond to the embodiment of FIG. 1 and therefore, require no additional explanation. In the embodiment according to FIG. 2, the supply of the amplifier is filtered by the resistance R5 in conjunction with the condenser C1, as no bell is provided for in this system. In contrast to the arrangement of FIG. 1, the system of FIG. 2 provides for the polarity of the potential applied by the exchange on the station, to be correct relative to the amplifier in rest as well as in speaking position, i.e. minus is on the terminal *a*, and plus on the terminal *b*. This polarity is reversed by the exchange, permanently during the calling procedure and briefly for initiating the scanning procedure. This system lacks a contact *k*1 for impeding a dummy or reactive engagement of the exchange, a fact which on condition that the exchange is capable of quickly recognizing and disconnecting such dummy engagements, represents no significant drawback relative to the embodiment of FIG. 1. In the rest position, the two cradle switch contacts GK1 and GK2 connect the amplifier via the two rectifiers G4 and G5 with the line *a*, *b* in a manner such that the amplifier, with the line polarity inverted relative to the normal state, obtains the polarity required for its functioning properly. This arrangement enables the exchange to switch in the amplifier of the station, for calling purposes, by reversing the polarity. The input of the amplifier is connected with the line through the cradle switch contact GK3 (which is closed in the rest position) and the condenser C6, with the assistance of the transducer SM, whereby audio signals emitted by the exchange for calling purposes, are amplified. The output signal of the amplifier passes through the cradle switch contact GK5 (which is in its rest position) and the windings W2 and W3 of the transformer S, to the electro-acoustic transducer W which emits an audible signal. The balanced network consisting of the resistance R4 and the condenser C4 which in this instance would only damp, is cut off by the cradle switch contact GK4. The filter consisting of the choke DR and the condenser C5 prevents the amplified energy from flowing back to the amplifier input. The release system for the emission of selection impulses differs from that of FIG. 1, as noted above. The magnet coil actuating the release mechanism is designated as E, as in FIG. 1. In contrast to the arrangement of FIG. 1, the current flowing in the coil E serves merely for preparing the initiation of the scanning operation. The actual initiation of the scanning operation is effected by the interruption of the current in the coil.

Figure 9:
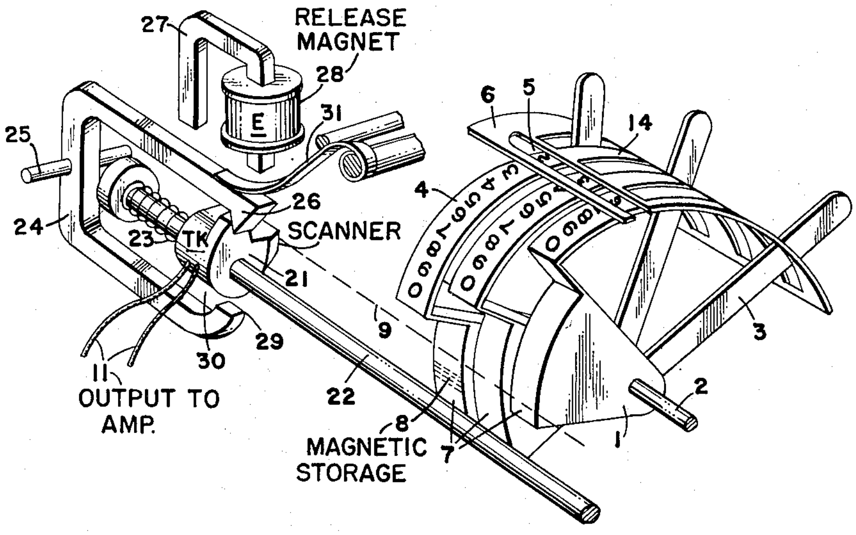
FIGURE 9 is a view in perspective of storage devices and a readout according to the invention, as illustrated otherwise in FIGURES 3 and 8.

A corresponding release mechanism is exemplified in FIGS. 8 and 9 wherein 21 denotes the scanning device supported on a rail 22. The device 21 is blocked by an armature 24 which is mounted for rotation on a shaft 25, and which is provided with a pawl 26 which secures the device 21 in the position of preparedness, overcoming the force of the wound spring 23. A leaf spring 31 tends to maintain the armature 24 in its rest position. When the electromagnet 27 including the coil 28 is energized, it pulls the armature 24 upwardly. This causes the pawl 26 to be disengaged so the scanning device, under the influence of the spring 23, moves toward the right in FIG. 8 until the cam 30 abuts against the, upwardly displaced, stop 29 provided on the armature. When the current in coil 28 is interrupted, the armature 24 returns, assisted by the leaf spring 31, into its rest position whereupon the scanning device, under the influence of the spring 23, travels along the rail 22 toward the right so as to effect scanning of the information carrier.

As shown in FIG. 2, the coil E which corresponds to the coil 28 in FIG. 8, is connected in series with the rectifier G3 so that the coil is traversed by the current when the cradle switch contacts are in their working positions, and the polarity on the terminals *a* and *b* is inverted relative to the normal condition. With outgoing communications the closing of the cradle switch contacts causes the loop to be closed in normal fashion, whereupon the exchange switches in the communication. By brief, temporary reversal of the polarity of the subscriber's line, the exchange supplies the criterion for initiating the scanning operation, the scanning operation being started only on restoration of the normal polarity, as explained above. If by chance, the scanning device should be in a state of preparedness when a call is received from the exchange, the microphone is short-circuited by the contact *k* so that immediate speaking is not possible. If, however, the exchange when answering a call, returns the polarity into the normal condition with a certain delay, the magnet E responds whenever a call is taken, whereby in the event the scanning device is in a state of preparedness, the scanning operation is initiated and the contact *k* is reversed. In this case, the initiation of the scanning procedure has no influence on the exchange. Normally, i.e. if the scanning device is not in a state of preparedness when a call comes in, the response of the magnet E has no effect whatsoever.

The invention may be applied without any difficulty or inconvenience to stations wherein the circuits for the microphone and the receiver are completely separated as far as alternating current is concerned, and which are connected to the exchange by a 4 wire system.

The invention has the signal advantage of providing subscribers' stations which are functionally adapted to the high operating speeds of electronic exchanges and which simplify the dialing procedure for the subscriber by comparison with existing systems.

We wish it to be understood that we do not desire to be limited to the details of construction, circuit arrangement or operation shown and described herein as quite a number of modifications within the scope of the following claims are likely to occur to workers in this field which would not depart from the spirit of this invention nor involve any sacrifice of the advantages thereof.

We claim:

1. In a telephone sub-station system, a plurality of multi-character storage elements, means for individually setting said elements along predetermined paths to predetermined positions, each of said positions representing one of said characters, multiple element indicia applied to each character position of each of said storage elements, said indicia being magnetically readable and all said indicia being physically arrayed in paths extending transversely of said predetermined paths, said storage elements being so positioned relative to one another that for any selected set of positions of said storage elements said indicia elements all extend in a single line, a single magnetic read-out device, and means for moving said single magnetic read-out device at will over a path extending immediately adjacent to said single line to read out said indicia elements in time sequence in the form of electrical signals, a subscriber's line coupled to said magnetic read-out device, a microphone, an amplifier, means supplying power to said amplifier via said subscriber's line, means connecting said read-out device to said amplifier for amplification of said signals, means coupling said microphone to said amplifier, and means for alternatively connecting said amplifier to said line and to said microphone.

2. In a telephone sub-station system, a plurality of multi-character storage elements, means for individually setting said elements along predetermined paths to predetermined positions, each of said positions representing one of said characters, multiple element indicia applied to each character position of each of said storage elements, said indicia being magnetically readable and all said indicia being physically arrayed in paths extending transversely of said predetermined paths, said storage elements being so positioned relative to one another that for any selected set of positions of said storage elements said indicia elements all extend in a single line, a single magnetic read-out device, and means for moving said single magnetic read-out device at will over a path extending immediately adjacent to said single line to read out said indicia elements in time sequence in the form of electrical signals, a subscriber's line coupled to said magnetic read-out device, means for initiating operation of said means for moving said single magnetic read-out device, said means being responsive to one predetermined polarity of a control signal only, and means for controlling the polarity of said control signal.

3. In a telephone sub-station system, a plurality of multi-character storage elements, means for individually setting said elements along predetermined paths to predetermined positions, each of said positions representing one of said characters, multiple element indicia applied to each character position of each of said storage elements, said indicia being magnetically readable and all said indicia being physically arrayed in paths extending transversely of said predetermined paths, said storage elements being so positioned relative to one another that for any selected set of positions of said storage elements said indicia elements all extend in a single line, a single magnetic read-out device, and means for moving said single magnetic read-out device at will over a path extending immediately adjacent to said single line to read out said indicia elements in time sequence in the form of electrical signals, a subscriber's line coupled to said magnetic read-out device, wherein said subscriber's line has a normal polarity, means responsive to a first reversal of said normal polarity for conditioning said system for scanning, and means responsive to a further reversal of said polarity for initiating operation of said means for moving said single magnetic read-out device.

References Cited in the file of this patent

UNITED STATES PATENTS

| | | |
|---|---|---|
| 2,244,500 | Nyquist | June 3, 1941 |
| 2,393,790 | Mallina | Jan. 29, 1946 |
| 2,697,749 | Jeanne | Dec. 21, 1954 |
| 2,763,726 | Weller | Sept. 18, 1956 |
| 2,791,638 | Houdek | May 7, 1957 |
| 2,824,173 | Meacham | Feb. 18, 1958 |
| 2,855,585 | Quinby | Oct. 7, 1958 |
| 2,892,897 | Vidal | June 30, 1959 |